(12) United States Patent
Fisher

(10) Patent No.: US 12,544,987 B2
(45) Date of Patent: Feb. 10, 2026

(54) METHOD OF MAKING A BARN CURTAIN WITH JOINED PANELS

(71) Applicant: Shady Lane Curtains, Bird-in-Hand, PA (US)

(72) Inventor: Samuel Fisher, Bird-in-Hand, PA (US)

(73) Assignee: Shady Lane Curtains, LLC, Bird-In-Hand, PA (US)

( * ) Notice: Subject to any disclaimer, the term of this patent is extended or adjusted under 35 U.S.C. 154(b) by 0 days.

(21) Appl. No.: 17/993,404

(22) Filed: Nov. 23, 2022

(65) Prior Publication Data
US 2023/0087955 A1 Mar. 23, 2023

Related U.S. Application Data

(63) Continuation of application No. 15/980,229, filed on May 15, 2018, now Pat. No. 11,534,983, which is a
(Continued)

(51) Int. Cl.
*B29C 65/18* (2006.01)
*A01K 1/00* (2006.01)
(Continued)

(52) U.S. Cl.
CPC .............. *B29C 65/18* (2013.01); *A01K 1/00* (2013.01); *B29C 65/103* (2013.01); *B29C 65/7832* (2013.01); *B29C 65/7894* (2013.01); *B29C 66/1122* (2013.01); *B29C 66/135* (2013.01); *B29C 66/43* (2013.01); *B29C 66/431* (2013.01);
(Continued)

(58) Field of Classification Search
CPC ... B29C 65/18; B29C 65/103; B29C 65/7832; B29C 65/7894; B29C 66/1122; B29C 66/135; B29C 66/43; B29C 66/431; B29C 66/45; B29C 66/729; B29C 66/73921;
(Continued)

(56) References Cited

U.S. PATENT DOCUMENTS 2,702,081 A 2/1955 North et al.
3,441,233 A * 4/1969 Defontenay ........... B65H 59/38
242/414.1
(Continued)

FOREIGN PATENT DOCUMENTS

DE 202016104323 U1 * 9/2016 ............. B29C 65/10

OTHER PUBLICATIONS

YouTube Video, "Leister Tutorial Hemtek ST Applications", https://www.youtube.com/watch?v=iL8QCXyrtuQ including screen shot of video at 2:06 (Mar. 2017). (Year: 2017).

*Primary Examiner* — Christopher W Raimund
(74) *Attorney, Agent, or Firm* — Barley Snyder

(57) ABSTRACT

A joiner for preparing a barn curtain comprising a welding machine. The joiner for preparing the barn curtain further comprising a non-transparent panel feeder feeding non-transparent panel material to the welding machine. The joiner for preparing the barn curtain further comprising a transparent panel feeder feeding transparent panel material to the welding machine. The joiner for preparing the barn curtain further comprising a support roller supporting the feeding of the non-transparent panel feeder and the transparent panel feeder. The joiner for preparing the barn curtain further comprising a barn curtain spooler receiving the barn curtain output from the welding machine.

19 Claims, 14 Drawing Sheets

Related U.S. Application Data continuation-in-part of application No. 14/995,765, filed on Jan. 14, 2016, now Pat. No. 11,134,652.

(51) Int. Cl.
*B29C 65/00* (2006.01)
*B29C 65/10* (2006.01)
*B29C 65/78* (2006.01)
*B29L 31/00* (2006.01)

(52) U.S. Cl.
CPC ............ *B29C 66/45* (2013.01); *B29C 66/729* (2013.01); *B29C 66/73921* (2013.01); *B29C 66/69* (2013.01); *B29K 2713/00* (2013.01); *B29K 2995/0026* (2013.01); *B29L 2031/719* (2013.01)

(58) Field of Classification Search
CPC ...... B29C 66/69; A01K 1/00; B29K 2713/00; B29K 2995/0026; B29L 2031/719
See application file for complete search history.

(56) References Cited

U.S. PATENT DOCUMENTS

| | | | |
|---|---|---|---|
| 3,445,629 A | 5/1969 | Stark et al. | |
| 3,741,631 A | 6/1973 | Laing | |
| 4,244,417 A | 1/1981 | Taylor | |
| 4,447,288 A | 5/1984 | Seaman | |
| 5,107,917 A | 4/1992 | Larsson | |
| 5,353,858 A | 10/1994 | Hartmann | |
| 5,520,236 A | 5/1996 | Thomas et al. | |
| 5,813,599 A | 9/1998 | Hoff | |
| 6,042,475 A | 3/2000 | Darden | |
| 6,155,326 A | 12/2000 | Imhoff et al. | |
| 6,196,147 B1* | 3/2001 | Burton .................. | D05B 33/00 493/405 |
| 6,612,359 B1 | 9/2003 | Moreau | |
| 7,624,783 B2 | 12/2009 | Sensenig | |
| 8,820,387 B2 | 9/2014 | Zettl | |
| 2002/0003026 A1* | 1/2002 | Hubbard ................. | B29C 66/71 156/308.4 |
| 2007/0193698 A1 | 8/2007 | Kraeutler | |
| 2009/0320729 A1 | 12/2009 | Henry et al. | |
| 2014/0338277 A1 | 11/2014 | Dimmer et al. | |
| 2016/0193781 A1 | 7/2016 | Nussbaum | |
| 2018/0036957 A1 | 2/2018 | Rieser et al. | |
| 2020/0308733 A1 | 10/2020 | Byun | |

\* cited by examiner

METHOD OF MAKING A BARN CURTAIN WITH JOINED PANELS

CROSS-REFERENCE TO RELATED APPLICATION

This application is a continuation of U.S. patent application Ser. No. 15/980,229 filed on Jun. 30, 2022, which is a continuation-in-part of U.S. patent application Ser. No. 14/995,765, filed on Jan. 14, 2016.

FIELD OF THE INVENTION

The present invention relates to a method of making a barn curtain and, more particularly, to a method of making a barn curtain with a plurality of joined panels.

BACKGROUND

Modern livestock management practices typically make use of structures in which to house and shelter livestock for at least a portion of time. The structures offer protection from environmental conditions such as temperature, sun exposure, precipitation, wind, and dust that are harmful or stressful to the livestock. The structures typically possess a roof that covers the structure. Where the structure is constructed with open walls, retractable curtain systems are typically positioned at the open walls. The barn curtain systems include a barn curtain that may be extended or not as dictated by environmental conditions. The unrolling or extending of the barn curtain, while limiting the entry of undesired environmental factors listed above, have the concurrent effect of limiting the amount of natural light reaching the interior of the structure. The limited light reduces the ability of workers or automated surveillance systems, either from inside or outside of the structure, to visually inspect the livestock and conditions contained within the structure. Furthermore, the limited light also may negatively affect the livestock held in the structure. The limited light may also increase the need for artificial light and thus increase energy costs.

As livestock operations grow, the size of the structures containing livestock may grow in square footage to accommodate larger herds. The increased dimensions of the structure affect the amount and reach of light entering into the interior of the structure. Efficient management of these larger structures is a challenge that requires a barn curtain that admits light, limits energy use, is efficient to manufacture, and is durable.

SUMMARY

A joiner for preparing a barn curtain comprising a welding machine. The joiner for preparing the barn curtain further comprising a non-transparent panel feeder feeding non-transparent panel material to the welding machine. The joiner for preparing the barn curtain further comprising a transparent panel feeder feeding transparent panel material to the welding machine. The joiner for preparing the barn curtain further comprising a support roller supporting the feeding of the non-transparent panel feeder and the transparent panel feeder and a barn curtain spooler receiving a barn curtain output from the welding machine.

BRIEF DESCRIPTION OF THE DRAWINGS

The invention will now be described by way of example with reference to the accompanying figures, of which.

DETAILED DESCRIPTION OF THE EMBODIMENTS

Figure 1:
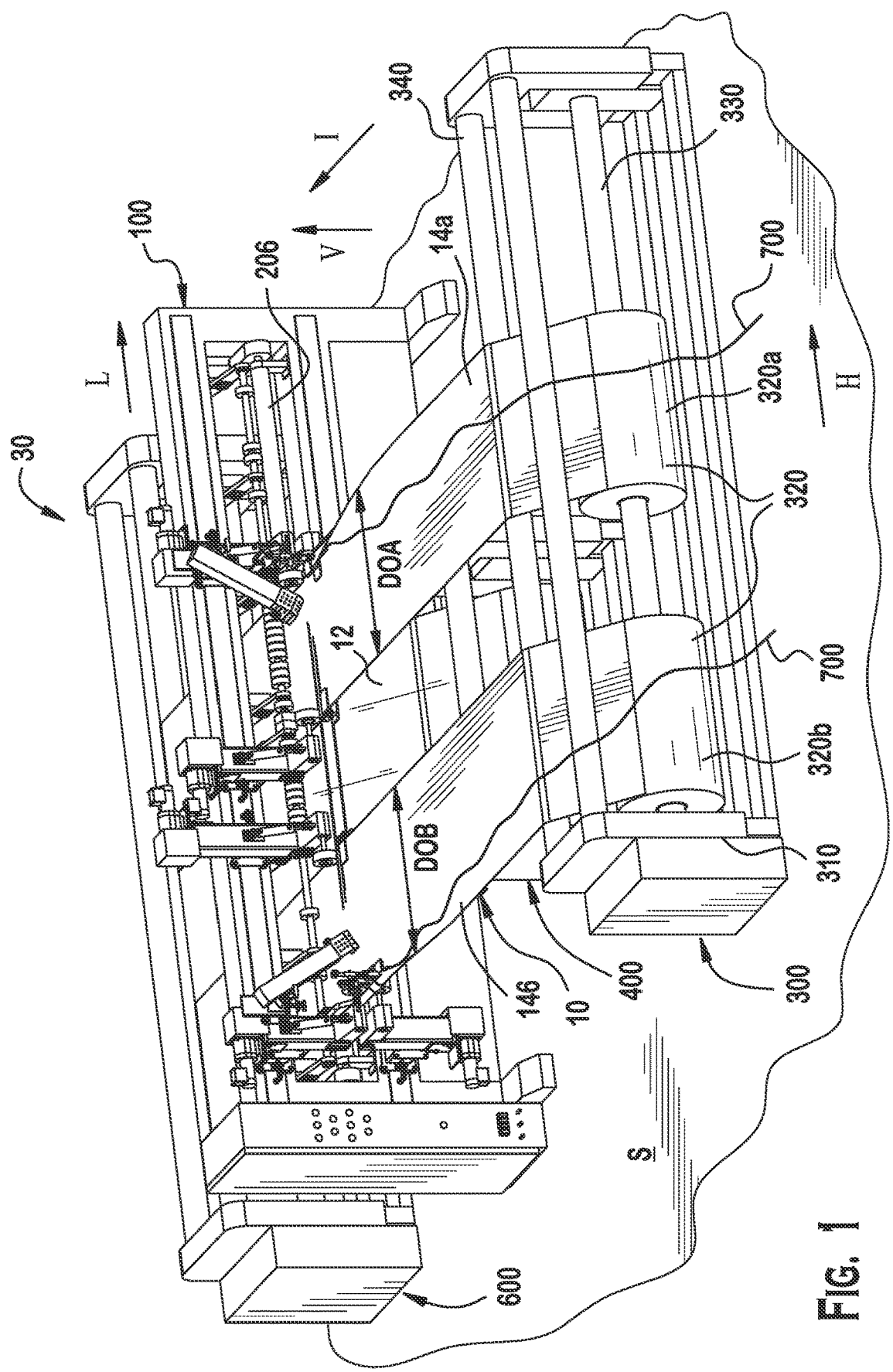
FIG. 1 is a perspective view of a barn curtain produced by a joiner according to the invention.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

With reference to FIG. 1, a barn curtain 10 is produced by a joiner 30 according to an embodiment of the invention. The barn curtain 10 and joiner 30 will now be described in greater detail.

Figure 2:
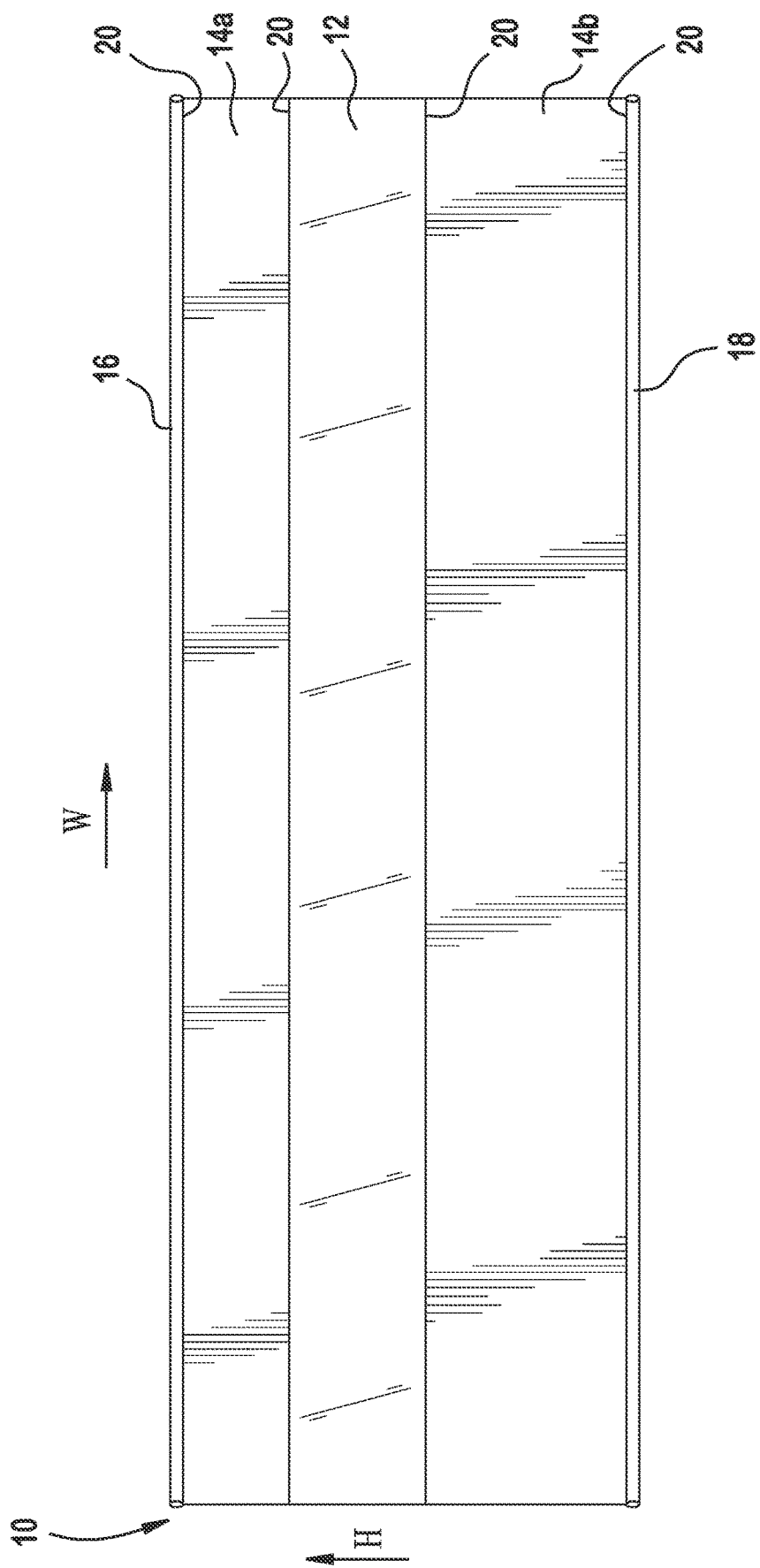
FIG. 2 is a front view of a barn curtain produced using the joiner of FIG. 1.

As shown in FIGS. 1 and 2, the barn curtain 10 includes a transparent panel 12 and at least one non-transparent panel 14 attached to the transparent panel 12.

The transparent panel 12 is a sheet of material sufficiently transparent to allow the passage of light. Non-limiting examples of material suitable for the transparent panel 12 include plastic materials known to those of skill in the art. In an embodiment, the transparent panel 12 has a haze less than 4.5% and light transmittance greater than 90%, both when tested according to ASTM 1003-00.

The non-transparent panel 14 is a sheet of plastic film or fabric material. In the shown embodiment, the non-transparent panel 14 is opaque. However, one skilled in the art should appreciate that the non-transparent panel 14 could also be a translucent material which transmits light, though at a transmission rate less than that of the transparent panel 12.

Many suitable materials for the transparent panel 12 and the non-transparent panel 14 are known and available; in an embodiment, the transparent panel 12 and the non-transparent panel 14 are comprised of materials sufficiently strong and flexible to allow the barn curtain 10 to be rolled into a cylindrical shape without cracking or fracturing as conditions warrant. The material chosen for the panels 12, 14 may additionally be abrasion-resistant, weatherable, and dimensionally stable.

In the embodiment shown in FIGS. 1 and 2, the barn curtain 10 includes a pair of non-transparent panels 14a and 14b and a transparent panel 12 positioned between the pair of non-transparent panels 14. A first non-transparent panel 14a is provided and is a rectangular section of material positioned along an upper portion of the barn curtain 10. A second non-transparent panel 14b is also provided and is a rectangular section of material that is positioned along a lower portion of the barn curtain 10. The first non-transparent panel 14a and the second non-transparent panel 14b have the same width, but in the shown embodiment, the second non-transparent panel 14b has greater height than the first non-transparent panel 14a in a height direction H of the barn curtain 10. The transparent panel 12 is a rectangular section of material that positioned between the first and second non-transparent panels 14a, 14b.

As shown in FIG. 2, the transparent and non-transparent panels 12, 14 are joined 20 to each other, described in greater detail below, and are arranged in a generally horizontal and alternating order. The transparent panel 12 and non-transparent panels 14a and 14b are attached to each other in such an order that light may be introduced into a structure (not shown) through the transparent panel 12. An upper side of the transparent panel 12 is joined 20 to a lower side of the first non-transparent panel 14a, while a lower side of the transparent panel 12 is joined 20 to an upper side of the second non-transparent panel 14b. One skilled in the art should appreciate that the barn curtain 10 may be designed differently than shown; the non-transparent panel 14 and the transparent panel 12 may be arranged in different configurations.

As shown in FIG. 2, the barn curtain 10 further includes an upper support receiving passageway 16 and a lower support receiving passageway 18. The upper support receiving passageway 16, as described in greater detail below, is formed by looping and joining 20 an upper side of the first non-transparent panel 14a to a surface of the first non-transparent panel 14a. The lower support receiving passageway 18 is similarly formed by looping and joining 20 a lower side of the second non-transparent panel 14b to a surface of the second non-transparent panel 14b. Both the upper support receiving passageway 16 and the lower support receiving passageway 18 are tubular passageways in the shown embodiment that are sized to receive an upper curtain support (not shown) and a lower curtain support (not shown), respectively.

Figure 3:
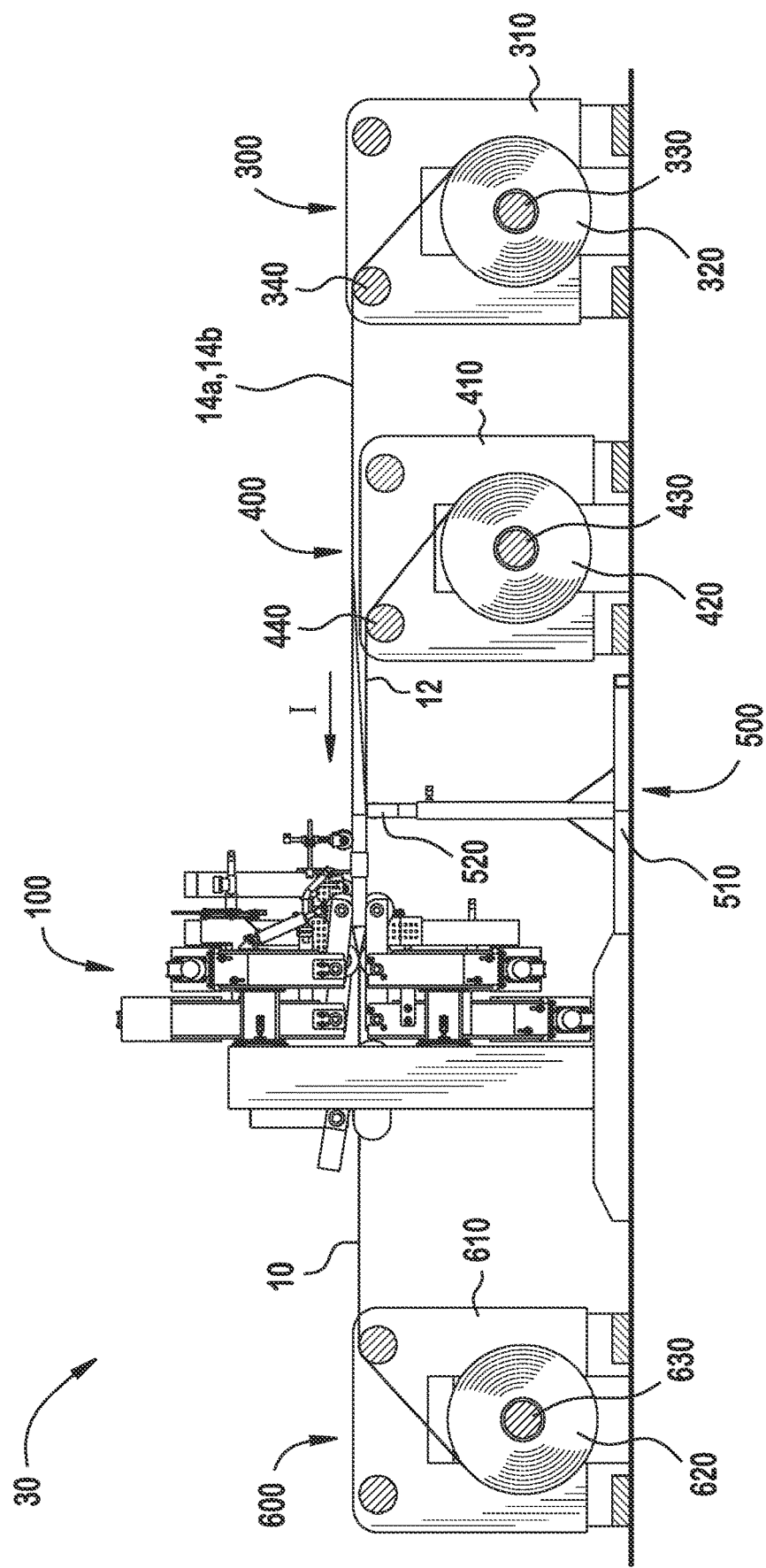
FIG. 3 is a side view of the joiner of FIG. 1.

Now, with reference to FIGS. 1 and 3, the joiner 30 is shown and generally includes a welding machine 100, a non-transparent panel feeder 300 feeding non-transparent panel 14 material to the welding machine 100, a transparent panel feeder 400 feeding transparent panel 12 material to the welding machine 100, a support roller 500 supporting the feeding of the non-transparent panel feeder 300 and the transparent panel feeder 400, and a barn curtain spooler 600 receiving the barn curtain 10 output from the welding machine 100.

The welding machine 100 will now be described in detail with reference to FIGS. 4-7 and 11. The welding machine 100 includes a joining base 110, a pair of rails 120, a plurality of roller assemblies 130, a pair of inner heater assemblies 140, a pair of outer heater assemblies 170, an outlet roller 200, a drive shaft 206, and a controller 210.

Figure 4:
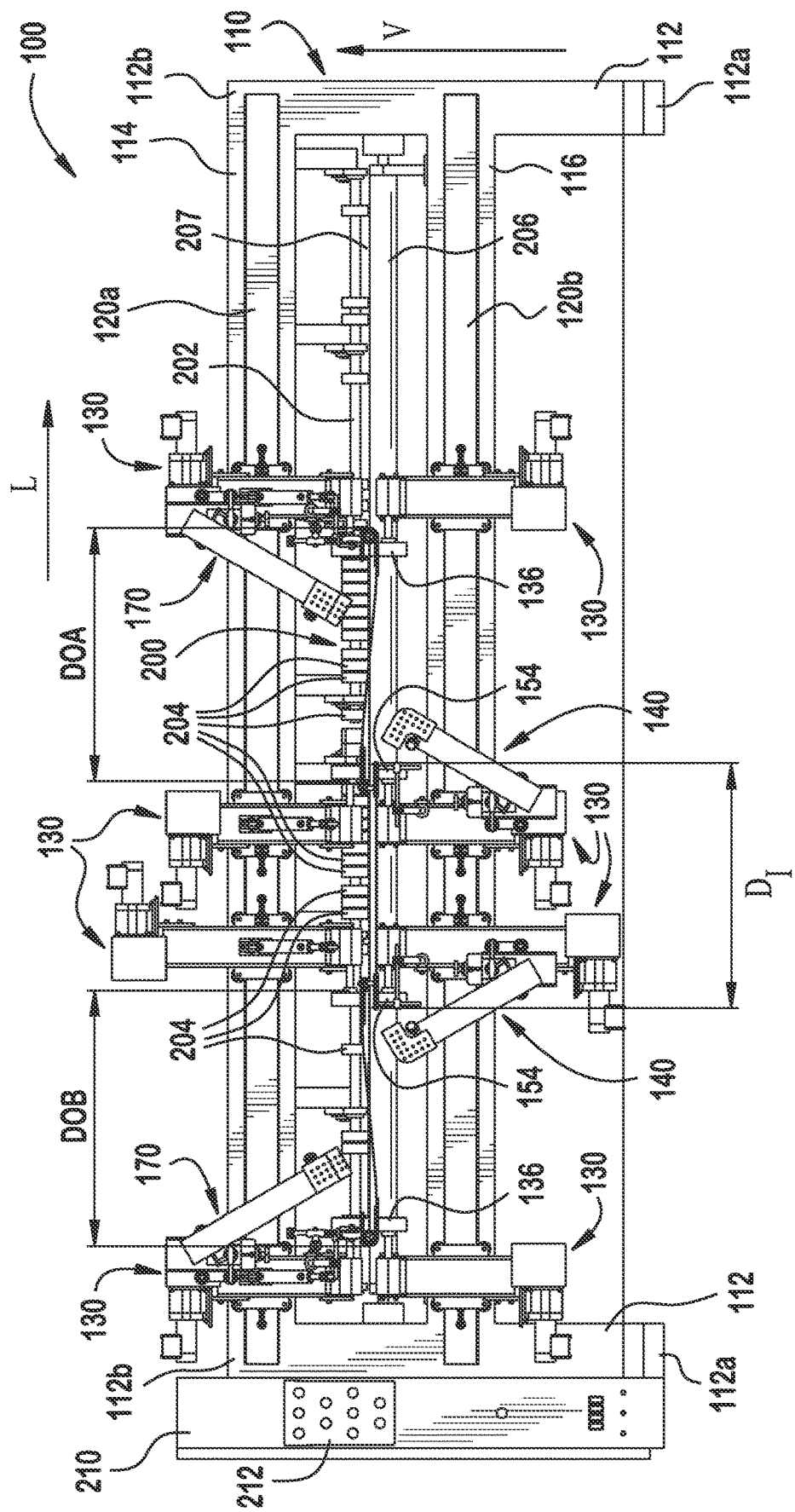
FIG. 4 is a front view of a welding machine of the joiner.

The joining base 110 is shown in FIG. 4. The joining base 110 has a pair of support legs 112 spaced apart in a longitudinal direction L of the welding machine 100. Each of the support legs 112 has a first end 112a and an opposite second end 112b. The first end 112a abuts a surface S on which the welding machine 100 stands and supports the welding machine 100 on the surface S. The joining base 110 has an upper cross piece 114 extending in the longitudinal direction L and connecting the second ends 112b of the support legs 112. The joining base 110 has a lower cross piece 116 extending in the longitudinal direction L and connecting the support legs 112 approximately centrally between the first end 112a and the second end 112b of each.

The pair of rails 120, as shown in FIG. 4, include an upper rail 120a disposed on the upper cross piece 114 and a lower rail 120b disposed on the lower cross piece 116. The rails 120 extend along an entire length of the upper cross piece 114 and the lower cross piece 116, respectively. Each of the rails 120 may be any structure known to those with ordinary skill in the art capable of receiving a member slidable along a length of the rail 120.

Figure 5:
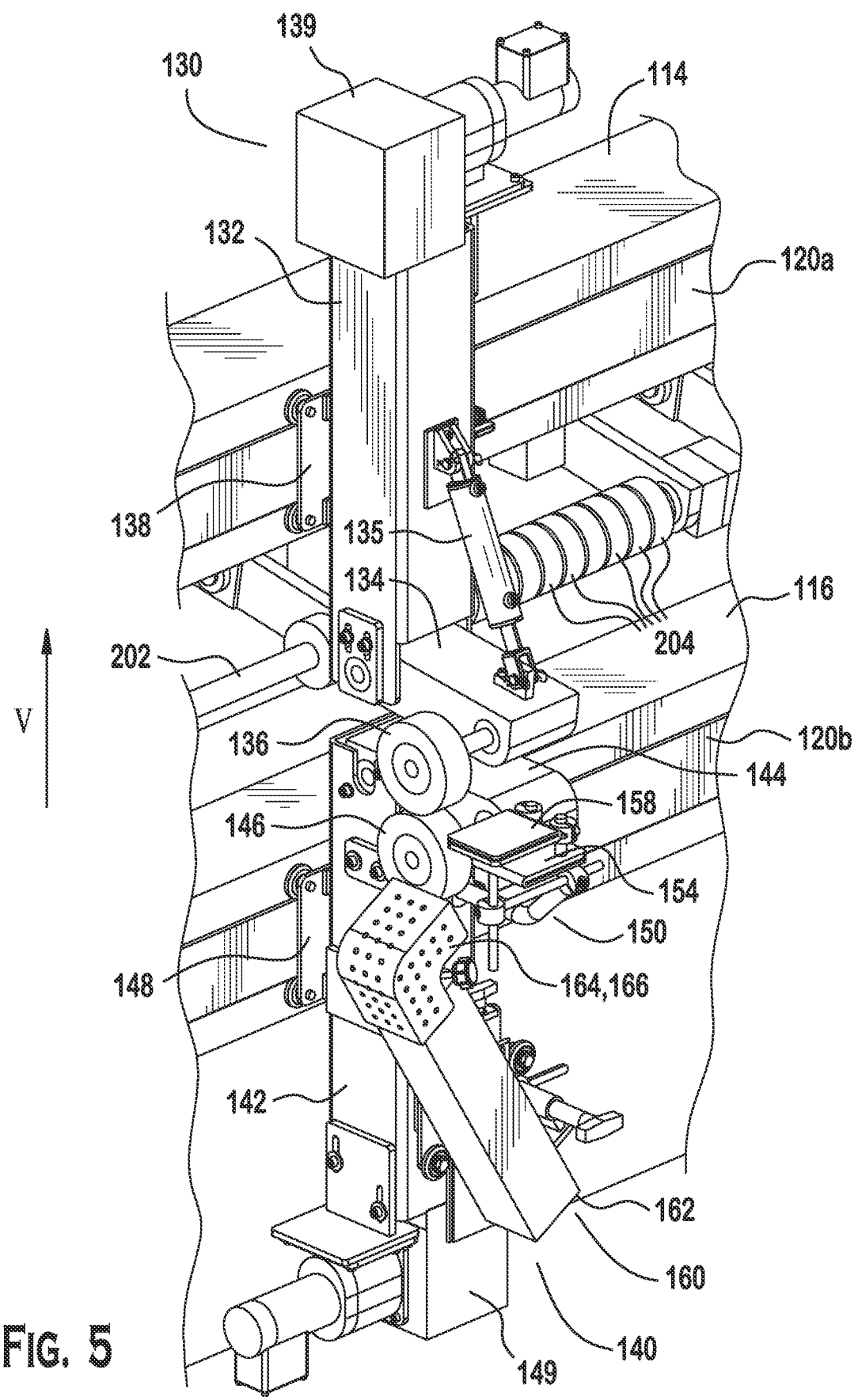
FIG. 5 is a detail perspective view of a roller assembly and an inner heater assembly of the welding machine.
Figure 6:
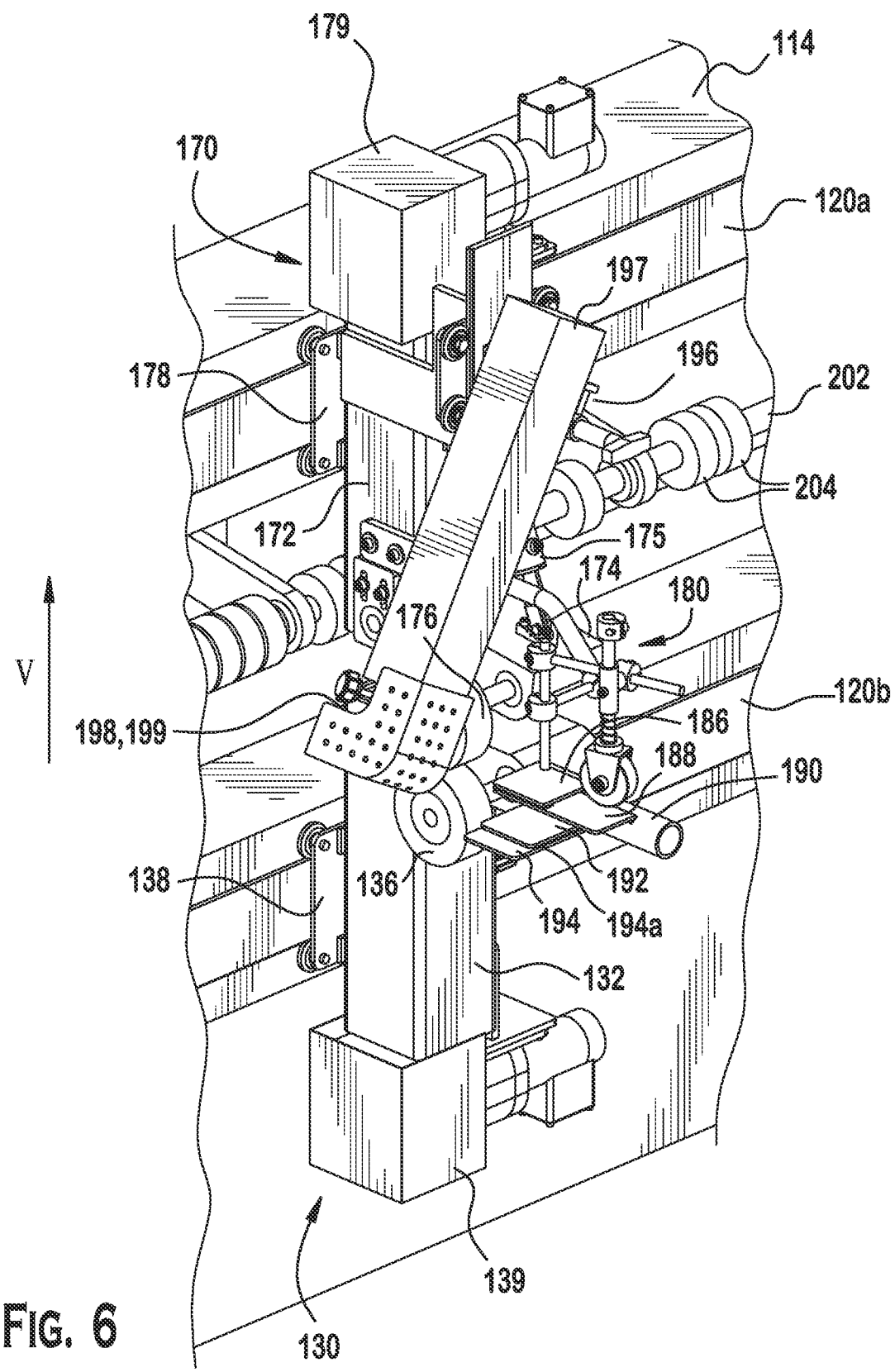
FIG. 6 is a detail perspective view of a roller assembly and an outer heater assembly of the welding machine.

The plurality of roller assemblies 130 are shown in FIGS. 4-6. Each roller assembly 130, as shown in FIGS. 5 and 6, has a roller base 132 and a roller arm 134 extending from an end of the roller base 132. A roller wheel 136 is rotatably attached to an end of the roller arm 134 opposite the roller base 132 and extends away from the roller arm 134. In an embodiment shown in FIG. 5, the roller assembly 130 has an adjustment device 135 connected between the roller base 132 and the roller arm 134 permitting tilting adjustment of the roller arm 134 with respect to the roller base 132. In another embodiment shown in FIG. 6, the roller assembly 130 does not have an adjustment device 135 and the roller arm 134 is fixed at the end of the roller base 132. In the shown embodiment, the adjustment device 135 is a hydraulic cylinder but one with ordinary skill in the art would understand that the adjustment device may be any device that permits tilting of the roller arm 143 with respect to the roller base 132.

As shown in FIGS. 5 and 6, each roller assembly 130 has a slidable attachment 138 disposed on a side of the roller base 132. The slidable attachment 138 is attachable to either of the rails 120 in a manner that permits the roller assembly 130 to slidably move along a length of the rail 120. The slidable attachment 138 may be attached to the rail 120 in a variety of orientations; the slidable attachment 138 may be attached such that the end of the roller base 132 having the roller arm 134 is positioned below the rail 120 in a vertical direction V, as shown in FIG. 5, or the slidable attachment 138 may be attached such that the end of the roller base 132 having the roller arm 134 is positioned above the rail 120 in the vertical direction V, as shown in FIG. 6. In the shown embodiment, the slidable attachment 138 is a plate having a plurality of rotatable wheels engaging slots of the rail 120. The slidable attachment 138 may alternatively be any type of slidable attachment engaging a rail known to those with ordinary skill in the art.

Each roller assembly 130, as shown in FIGS. 5 and 6, has a roller drive 139 disposed on the roller base 132 and driving movement of the roller assembly 130 along the rail 120. In the shown embodiment, the roller drive 139 is an electric motor. One with ordinary skill in the art would understand that the roller drive 139 may alternatively be any other type of drive known to those with ordinary skill in the art.

Figure 7:
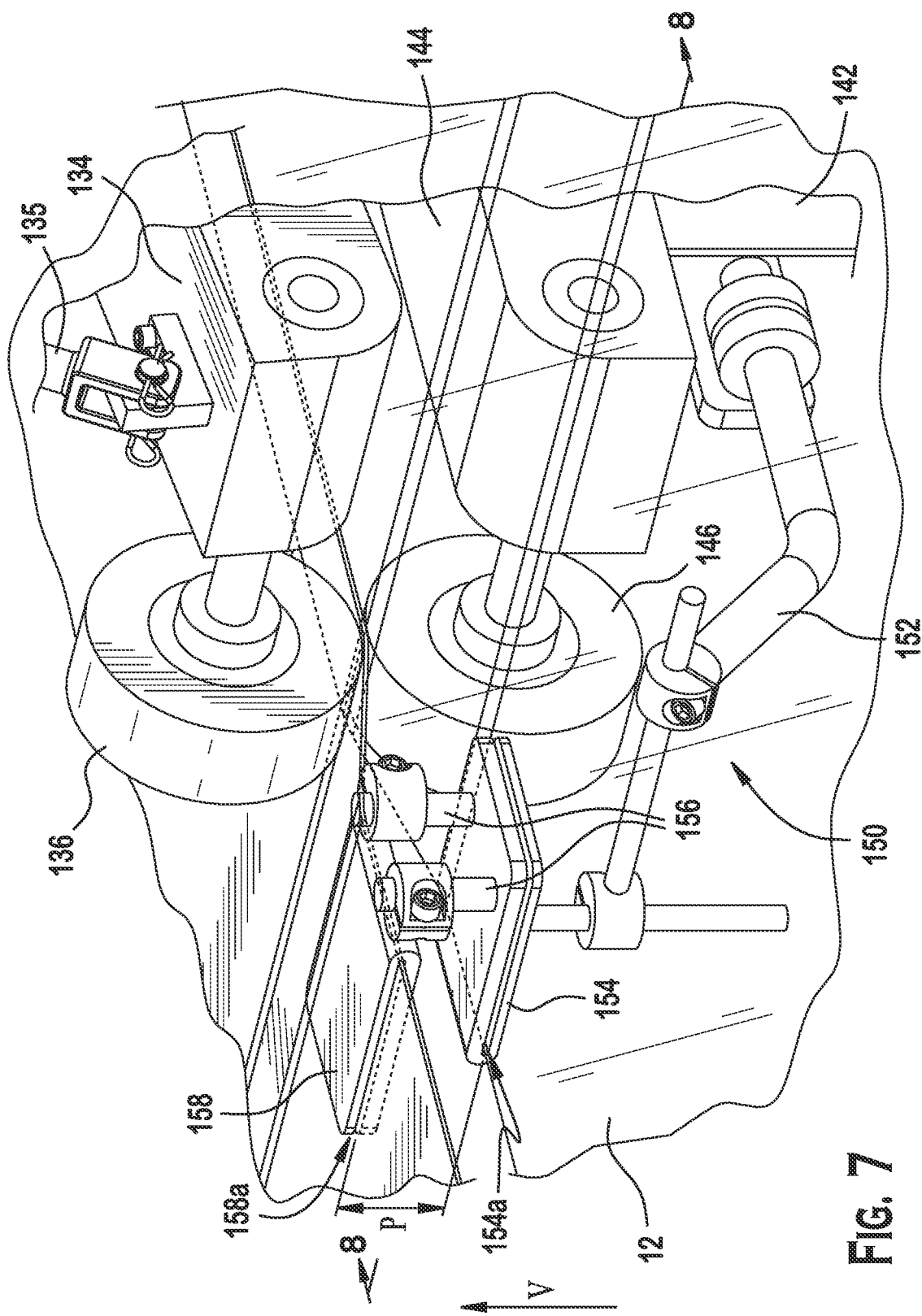
FIG. 7 is a detail perspective view of a transparent panel and a non-transparent panel of the barn curtain in the welding machine.

The plurality of inner heater assemblies 140 are shown in FIGS. 4, 5, and 7. Each inner heater assembly 140, as shown in FIG. 5, has an inner heater base 142 and an inner heater arm 144 extending from an end of the inner heater base 142. A roller wheel 146 is rotatably attached to an end of the inner heater arm 144 opposite the inner heater base 142 and extends away from the inner heater arm 144. Each inner heater assembly 140 has a slidable attachment 148 disposed on a side of the inner heater base 142. The slidable attachment 148 of the inner heater assembly 140 is identical to the slidable attachment 138 of the roller assembly 130 described above and all attachments and operations of the slidable attachment 148 of the inner heater assembly 140 on the rails 120 are the same as those of the slidable attachment 138 of the roller assembly 130.

Each inner heater assembly 140, as shown in FIG. 5, has an inner heater drive 149 disposed on the inner heater base 142 and driving movement of the inner heater assembly 140 along the rail 120. In the shown embodiment, the inner heater drive 149 is an electric motor. One with ordinary skill in the art would understand that the inner heater drive 149 may alternatively be any other type of drive known to those with ordinary skill in the art.

Each inner heater assembly 140, as shown in FIGS. 5 and 7, has an inner plate assembly 150. The inner plate assembly 150 includes an inner plate support arm 152 having a first end fixed to the inner heater base 142 and an opposite second end extending away from the inner heater base 142. As shown in FIG. 7, a lower inner plate 154 has a bottom surface attached to the second end of the inner plate support arm 152. The lower inner plate 154 is formed from a piece of heat conductive material, such as metal, and is bent in half to form a lower inner panel receiving passageway 154*a* between the bent halves. A pair of plate stands 156 of the inner plate assembly 150 have a first end attached to an upper surface of the lower inner plate 154 and an opposite second end attached to a lower surface of an upper inner plate 158. The upper inner plate 158, similarly to the lower inner plate 154, is formed from a piece of heat conductive material, such as metal, and is bent in half to form an upper inner panel receiving passageway 158*a* between the bent halves. The lower inner panel receiving passageway 154*a* and the upper inner panel receiving passageway 158*a* are separated by a distance P shown in FIG. 7.

Each inner heater assembly 140, as shown in FIG. 5, has a heater 160. The heater 160 has a first end 162 attached to the inner heater base 142 and an opposite second end 164 extending away from the inner heater base 142. The heater 160 has a heating element 166 on the second end 164. In the shown embodiment, the heating element 166 is an electric heating element, such as a coil, and includes a blower. The heating element 166 may alternatively be any heating element known to those with ordinary skill in the art capable of directing heat transmitted through air. The position of the heater 160 with respect to the inner heater base 142 is manually adjustable at the first end 162.

Figure 11:
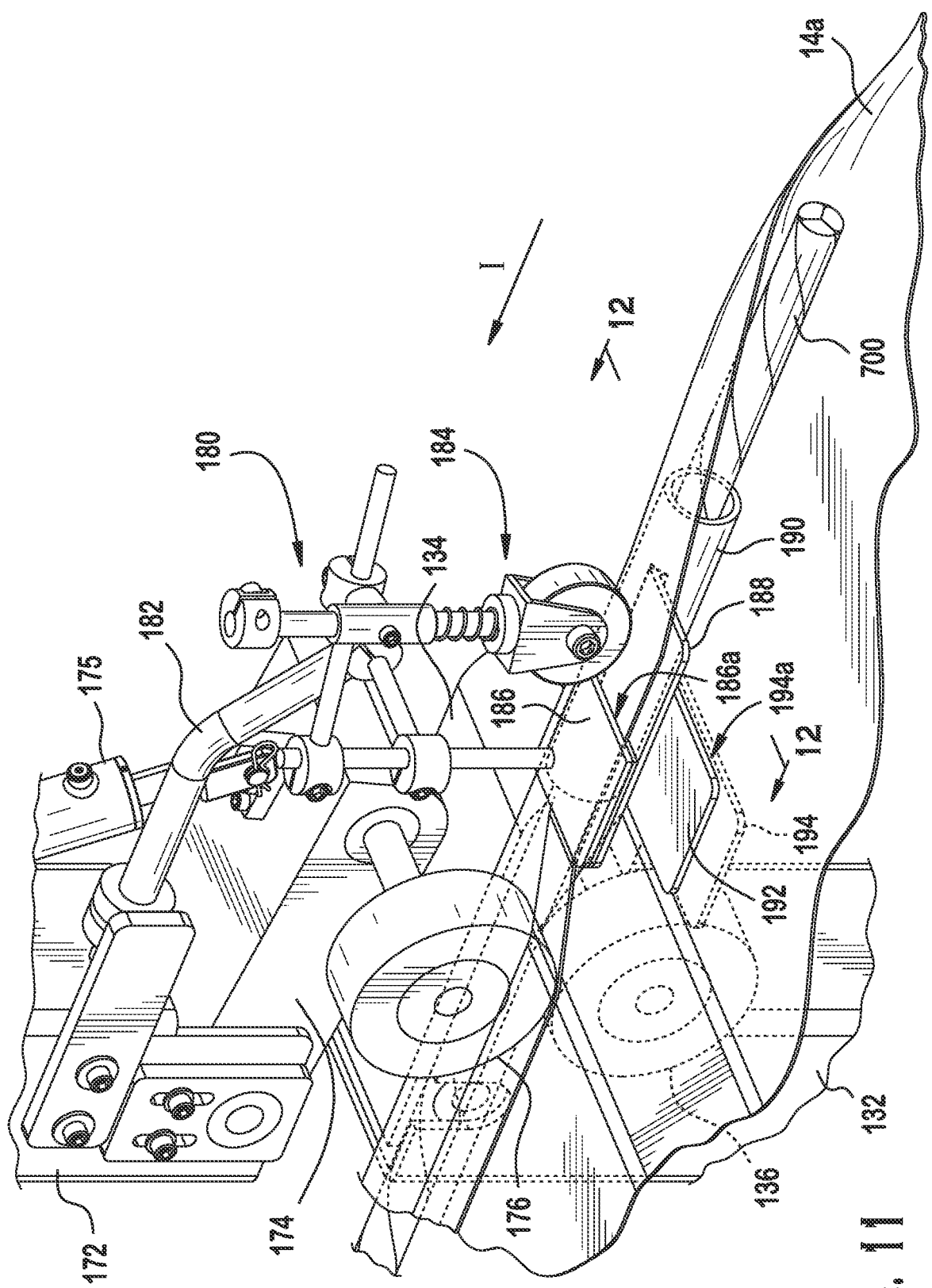
FIG. 11 is a detail perspective view of an outer side of a non-transparent panel in the welding machine.

The plurality of outer heater assemblies 170 are shown in FIGS. 4, 6, and 11. Each outer heater assembly 170, as shown in FIG. 6, has an outer heater base 172 and an outer heater arm 174 extending from an end of the outer heater base 172. A roller wheel 176 is rotatably attached to an end of the outer heater arm 174 opposite the outer heater base 172 and extends away from the outer heater arm 174. Each outer heater assembly 170 has an adjustment device 175 connected between the outer heater base 172 and the outer heater arm 174 permitting tilting adjustment of the outer heater arm 174 with respect to the outer heater base 172. In the shown embodiment, the adjustment device 175 is a hydraulic cylinder but one with ordinary skill in the art would understand that the adjustment device may be any device that permits tilting of the outer heater arm 174 with respect to the outer heater base 172.

Each outer heater assembly 170 has a slidable attachment 178 disposed on a side of the outer heater base 172. The slidable attachment 178 of the outer heater assembly 170 is identical to the slidable attachment 138 of the roller assembly 130 described above and all attachments and operations of the slidable attachment 178 of the outer heater assembly 170 on the rails 120 are the same as those of the slidable attachment 138 of the roller assembly 130. Each outer heater assembly 170, as shown in FIG. 6, has an outer heater drive 179 disposed on the outer heater base 172 and driving movement of the outer heater assembly 170 along the rail 120. In the shown embodiment, the outer heater drive 179 is an electric motor. One with ordinary skill in the art would understand that the outer heater drive 179 may alternatively be any other type of drive known to those with ordinary skill in the art.

Each outer heater assembly 170, as shown in FIGS. 6 and 11, has an outer plate assembly 180. The outer plate assembly 180 includes an outer plate support arm 182 having a first end fixed to the outer heater base 172 and an opposite second end extending away from the outer heater base 172. The outer plate support arm 182 is attached to and supports a guiding wheel 184, a first upper outer plate 186, a second upper outer plate 188, a support tube 190, a first lower outer plate 192, a second lower outer plate 194, and a plate connection 195 of the outer plate assembly 180. Each of the first upper outer plate 186, the second upper outer plate 188, the first lower outer plate 192, and the second lower outer plate 194 is a planar plate formed from a heat conductive material, such as metal.

Figure 12:
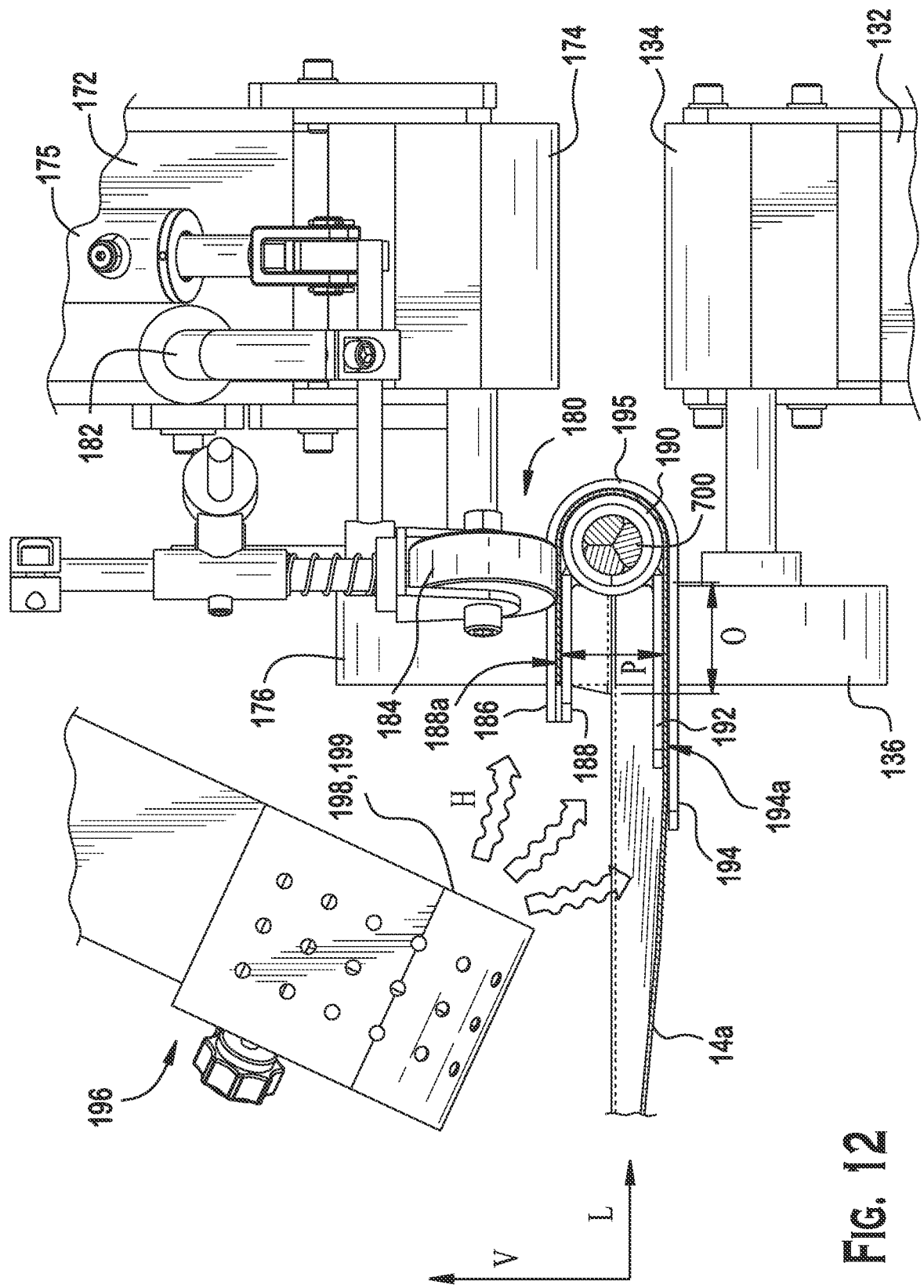
FIG. 12 is a sectional front view of the outer side of the non-transparent panel in the welding machine, taken along line 12-12 of FIG. 11.

As shown in FIG. 11, the first upper outer plate 186 has a top surface attached to the second end of the outer plate support arm 182. A guiding wheel 184 is rotatably attached to the outer plate support arm 182 between the first end and the second end. The guiding wheel 184 is positioned in front of the first upper outer plate 186 in an insertion direction I. The second upper outer plate 188 has a top surface attached to a bottom surface of the first upper outer plate 186. The second upper outer plate 188 and the first upper outer plate 186 form an upper outer panel receiving passageway 188*a* between them. The second upper outer plate 188 is attached to a top side of the support tube 190 in the vertical direction V. The support tube 190, as shown in FIG. 11, is a hollow cylindrical member. The first lower outer plate 192 and the second lower outer plate 194 are attached to an opposite bottom side of the support tube 190. The first lower outer plate 192 and the second lower outer plate 194 form a lower outer panel receiving passageway 194*a* between them. As shown in FIG. 12, the second lower outer plate 194 and the first upper outer plate 186 are connected by a curved plate connection 195 which extends around an outer side of the support tube 190.

Each outer heater assembly 170, as shown in FIG. 6, has a heater 196. The heater 196 has a first end 197 attached to the outer heater base 172 and an opposite second end 198 extending away from the outer heater base 172. The heater 196 has a heating element 199 on the second end 198. In the shown embodiment, the heating element 199 is an electric heating element, such as a coil, and includes a blower. The heating element 199 may alternatively be any heating element known to those with ordinary skill in the art capable of directing heat transmitted through air. The position of the heater 196 with respect to the outer heater base 172 is manually adjustable at the first end 197.

The outlet roller 200 is shown in FIGS. 4-6. The outlet roller 200 includes a guiding shaft 202 and a plurality of guiding wheels 204. The guiding shaft 202 extends along the longitudinal direction L and is attached between the pair of support legs 112. The guiding shaft 202 is disposed between the upper cross piece 114 and the lower cross piece 116 in the vertical direction V. The guiding wheels 204 are disposed along the guiding shaft 202. The outlet roller 200 is freely rotatable with respect to the joining base 110.

The drive shaft 206 is shown in FIGS. 1 and 4. The drive shaft 206 extends along the longitudinal direction L and is attached between the pair of support legs 112. The drive shaft 206 is disposed between the upper cross piece 114 and the lower cross piece 116 in the vertical direction V. The drive shaft 206 is disposed below the outlet roller 200 in the vertical direction V and forms a barn curtain receiving space 207 between the drive shaft 206 and the outlet roller 200. The drive shaft 206 is driven to rotate with respect to the joining base 110.

The controller 210 is shown in FIG. 4. The controller 210 is a processor connected to and capable of outputting electrical signals to control the roller drives 139, the inner heater drives 149, the outer heater drives 179, the heaters 160 of the inner heater assemblies 140, the heaters 196 of the outer heater assemblies 170, and the drive shaft 206. The controller 210 receives user input from an input-output device 212 shown in FIG. 4. The input-output device 212 may be a plurality of switches, knobs, buttons, a touch screen, or any other input-output device known to those with ordinary skill in the art and capable of receiving an input for a processor and outputting data gathered by the processor.

In the embodiment shown in FIGS. 1 and 4, to assemble the welding machine 100, two outer heater assemblies 170 and two roller assemblies 130 are attached to the upper rail 120a. The two roller assemblies 130, as shown in FIG. 4, are positioned approximately centrally along the upper rail 120a. Each of the outer heater assemblies 170 is positioned along the upper rail 120a on opposite sides of the two roller assemblies 130. Each of the outer heater assemblies 170 and roller assemblies 130 attached to the upper rail 120a are positioned such that an end having the roller wheel 136, 176 is positioned below the upper rail 120a in the vertical direction V. Each of the roller wheels 136, 176 of the outer heater assemblies 170 and roller assemblies 130 along the upper rail 120a is approximately aligned with the barn curtain receiving space 207.

The welding machine 100, as shown in the embodiment of FIGS. 1 and 4, further has two inner heater assemblies 140 and two roller assemblies 130 attached to the lower rail 120b. The two inner heater assemblies 140, as shown in FIG. 4, are positioned approximately centrally along the lower rail 120b such that the lower inner plates 154 of the inner heater assemblies 140 are separated by an inner distance DI. Each of the inner heater bases 142 of the inner heater assemblies 140 is aligned with the roller base 132 of one roller assembly 130 attached to the upper rail 120a. The outer heater assemblies 170 are positioned along the upper rail 120a such that the first lower outer plates 192 of the outer heater assemblies 170 are separated from the upper inner plate 158 of the nearest inner heater assembly 140 on the lower rail 120b by an outer distance DOA, DOB. The outer distances DOA, DOB may be the same or may be different from one another depending on the application. The two roller assemblies 130 positioned along the lower rail 120b, as shown in FIG. 4, are disposed on opposite sides of the two inner heater assemblies 140. Each of the roller bases 132 of the roller assemblies 130 attached to the lower rail 120b is aligned with the outer heater base 172 of one outer heater assembly 170 attached to the upper rail 120a.

Each of the inner heater assemblies 140 and roller assemblies 130 attached to the lower rail 120b, as shown in FIG. 4, are positioned such that an end having the roller wheel 146, 136 is positioned above the lower rail 120b in the vertical direction V. Each of the roller wheels 146, 136 of the inner heater assemblies 140 and roller assemblies 130 along the lower rail 120b is approximately aligned with the barn curtain receiving space 207. As shown in FIGS. 4-6, the roller wheels 136 of the roller assemblies 130 on the lower rail 120b are aligned with the roller wheels 176 of the outer heater assemblies 170 on the upper rail 120a and the roller wheels 146 of the inner heater assemblies 140 on the lower rail 120b are aligned with the roller wheels 136 of the roller assemblies 130 on the upper rail 120a.

The non-transparent panel feeder 300 is shown in FIGS. 1 and 3. The non-transparent panel feeder 300 includes a feeder base 310, a pair of non-transparent panel material spools 320, a spool shaft 330, and a feeder shaft 340. The spool shaft 330 extends in the longitudinal direction L between opposite ends 310a, 310b of the feeder base 310. The non-transparent panel material spools 320 are positioned on the spool shaft 330 and are rotatable with respect to the spool shaft 330. The non-transparent panel material spools 320 are each a continuous roll of non-transparent panel 14 material. The feeder shaft 340 extends in the longitudinal direction L between the opposite ends of the feeder base 310 and is disposed on an upper end of the feeder base 310 in the vertical direction V.

The transparent panel feeder 400 is shown in FIGS. 1 and 3. The transparent panel feeder 400 includes a feeder base 410, a transparent panel material spool 420, a spool shaft 430, and a feeder shaft 440. The spool shaft 430 extends in the longitudinal direction L between opposite ends of the feeder base 410. The transparent panel material spool 420 is positioned on the spool shaft 430 and is rotatable with respect to the spool shaft 430. The transparent panel material spool 420 is a continuous roll of transparent panel 12 material. The feeder shaft 440 extends in the longitudinal direction L between the opposite ends of the feeder base 410 and is disposed on an upper end of the feeder base 410 in the vertical direction V.

The support roller 500 is shown in FIG. 3. The support roller 500 includes a base 510 resting on the surface S and a support feeder shaft 520 disposed on an opposite end of the support roller 500 in the vertical direction V. The support feeder shaft 520 is rotatable with respect to the support roller 500.

The barn curtain spooler 600 is shown in FIGS. 1 and 3. The barn curtain spooler 600 includes a spooler base 610, a barn curtain material spool 620, a spool shaft 630, and a feeder shaft 640. The spool shaft 630 extends in the longitudinal direction L between opposite ends of the spooler base 610. The barn curtain material spool 620 is positioned on the spool shaft 630 and is rotatable with respect to the spool shaft 630. The barn curtain material spool 620 is a continuous roll of curtain 10 material. The feeder shaft 640 extends in the longitudinal direction L between the opposite ends of the spooler base 610 and is disposed on an upper end of the spooler base 610 in the vertical direction V.

A method of manufacturing the barn curtain 10 using the joiner 30 will now be described in greater detail with reference to FIGS. 1-14.

Initially, within the welding machine 100, the positions of the roller assemblies 130, inner heater assemblies 140, and outer heater assemblies 170 are set along the upper rail 210a and the lower rail 210b. Based on a user input of the outer distances DOA, DOB and the inner distance DI at the input-output device 212, the controller 210 controls the inner heater drives 149 to move the inner heater assemblies 140 along the lower rail 120b and the outer heater drives 179 to move the outer heater assemblies 170 along the upper rail 120a to have the input outer distances DOA, DOB and the input inner distance DI. As shown in FIGS. 1 and 2, the outer distance DOA corresponds to a height of the first non-transparent panel 14a in a height direction H of the barn curtain 10. The outer distance DOB corresponds to a height of the second non-transparent panel 14b in the height direction H. The inner distance DI corresponds to a height of the transparent panel 12 in the height direction H. After the inner heater assemblies 140 and outer heater assemblies 170 are driven to the proper positions, the controller 210 controls the roller drives 139 to move the roller assemblies 130 to positions opposite the corresponding heater assembly 140, 170 as described above.

Next, the non-transparent panel material spools 320 and the transparent panel material spool 420, as shown in FIGS. 1 and 3, are fed into the welding machine 100. The material of the non-transparent panel material spool 320a, corresponding to the first non-transparent panel 14a, is fed over the feeder shaft 340. The lower side of the first non-transparent panel 14a is fed into the upper inner receiving passageway 158a of an inner heater assembly 140 and the upper side of the first non-transparent panel 14a is fed into the lower outer panel receiving passageway 194a of an outer heater assembly 170. The material of the non-transparent material spool 320b, corresponding to the second non-transparent material 14b, is fed over the feeder shaft 340. The upper side of the second non-transparent panel 14b is similarly fed into the upper inner receiving passageway 158a of an inner heater assembly 140 and the lower side of the second non-transparent panel 14b is fed into the lower outer panel receiving passageway 194a of an outer heater assembly 170.

The material of the transparent panel material spool 420 corresponding to the transparent panel 12, as shown in FIGS. 1 and 3, is fed over the feeder shaft 440. The lower side of the transparent panel 12 is fed into the lower inner panel receiving passageway 154a of the inner heater assembly 140 receiving the second non-transparent material 14b. The upper side of the transparent panel 12 is fed into the lower inner panel receiving passageway 154a of the inner heater assembly 140 receiving the first non-transparent material 14a.

The material of the material spools 320a, 320b, and 420, as shown in FIG. 3, may be supported by the support feeder shaft 520 of the support roller 500 prior to entering the respective receiving passageways of the welding machine 100 described above. The non-transparent panels 14a, 14b and the transparent panel 12 of the material spools 320a, 320b, and 420 extend though the welding machine 100 in the barn curtain receiving space 207 and are held in engagement with the drive shaft 206 by the guiding wheels 204 of the outlet roller 200.

To join the non-transparent panels 14a, 14b and the transparent panel 12, the controller 210 drives the drive shaft 206 to turn, pulling the non-transparent panels 14a, 14b and the transparent panel 12 continuously from the non-transparent panel material spools 310 and the transparent panel material spool 420 through the welding machine 100 in the insertion direction I. The panels 12, 14a, 14b, as described above, are joined 20 to one another and each non-transparent panel 14a, 14b is looped and joined 20 to form the support receiving passageways 16, 18. The joining of the transparent panel 12 to the non-transparent panels 14a, 14b will be described first followed by the joining forming the support receiving passageways 16, 18.

The joining of the transparent panel 12 to the non-transparent panels 14a, 14b will now be described with reference to FIGS. 1 and 7-10. Only the joining of the lower side of the transparent panel 12 to the second non-transparent panel 14b will be described in detail with reference to the Figures, however, the joining of the upper side of the transparent panel 12 to the first non-transparent panel 14a is symmetrically identical about a central axis C of the welding machine 100 shown in FIG. 4.

Figure 8:
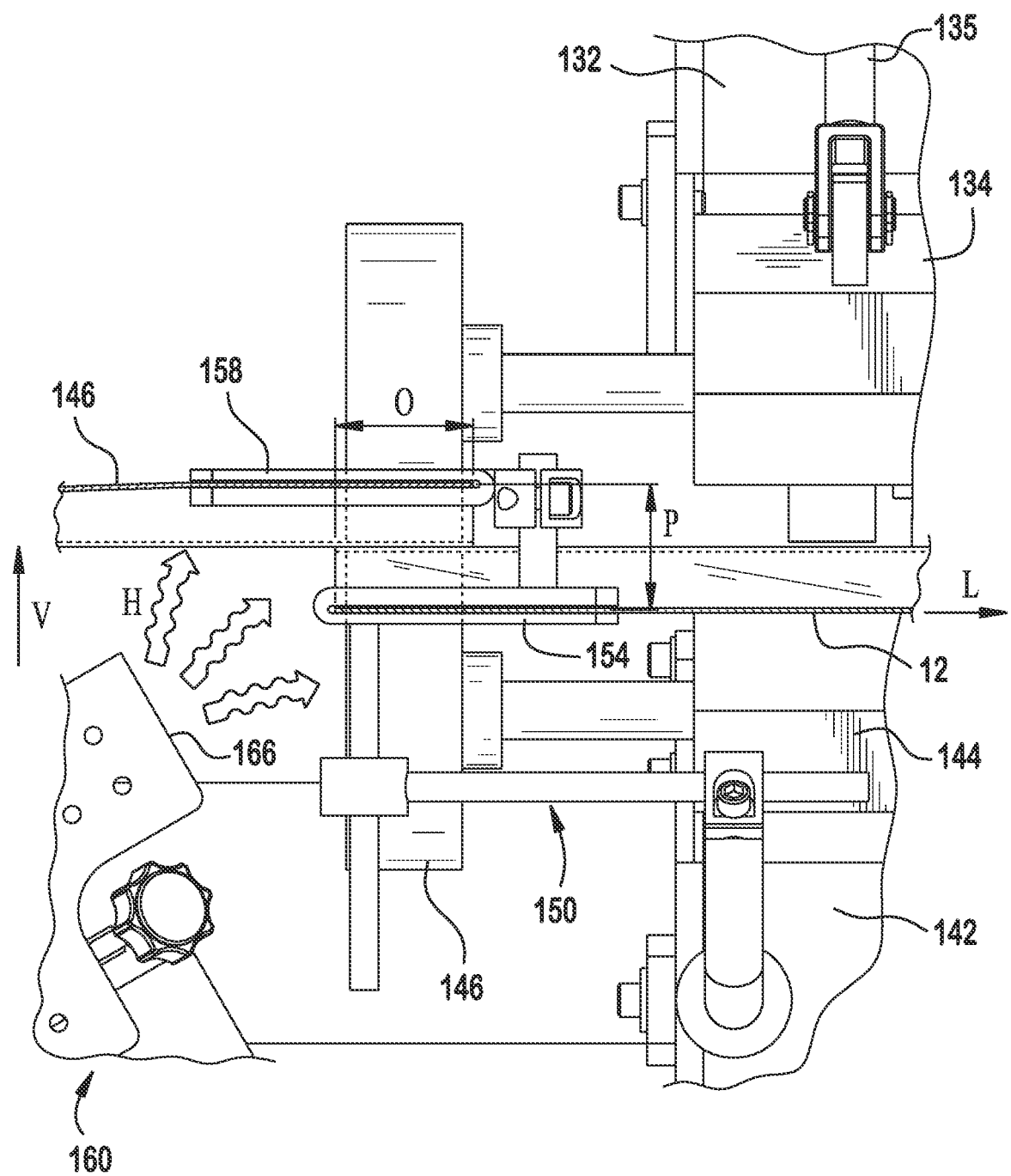
FIG. 8 is a sectional front view of the transparent panel and the non-transparent panel in the welding machine, taken along line 8-8 of FIG. 7.

As shown in FIGS. 7 and 8, the lower side of the transparent panel 12 moves through the lower inner panel receiving passageway 154 as the transparent panel 12 moves through the welding machine 100. The upper side of the second non-transparent panel 14b moves through the upper inner panel receiving passageway 158a as the second non-transparent panel 14b moves through the welding machine 100. At the upper inner plate 158 and the lower inner plate 154, as shown in FIGS. 7 and 8, the second non-transparent panel 14b and the transparent panel 12 are spaced apart by the distance P in the vertical direction V and overlap by a length O in the longitudinal direction L.

As shown in FIG. 8, during joining and as the second non-transparent panel 14b and transparent panel 12 are being moved through the welding machine 100 in the insertion direction I, the controller 210 controls the heater 160 of the inner heater assembly 140 to activate the heating element 166, emitting and transmitting a heat H in the direction of the upper inner plate 158 and the lower inner plate 154 from below the panels 12, 14b. The heat H heats the upper inner plate 158 and lower inner plate 154. When the upper inner plate 158 and the lower inner plate 154 are heated to a certain temperature, as the second non-transparent panel 14b passes through the upper inner panel receiving passageway 158a, the upper side of the second non-transparent panel 14b partially melts, and as the transparent panel 12 passes through the lower inner panel receiving passageway 154a, the lower side of the transparent material 12 partially melts. The temperature of the plates 154, 158 and heat H required for partial melting, as would be understood by one with ordinary skill in the art, depends on the material used for the transparent panel 12 and the non-transparent panels 14a, 14b.

Figure 9:
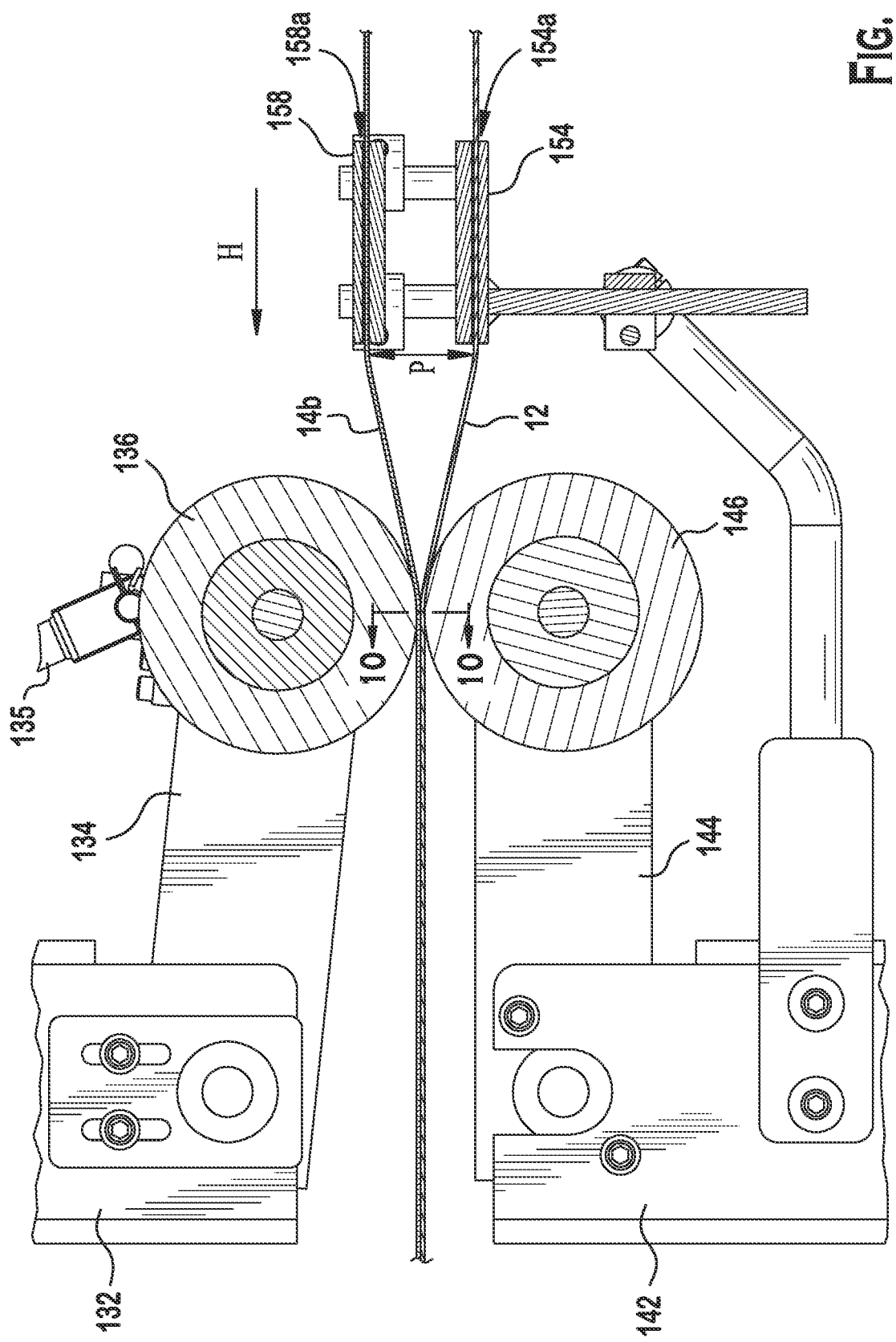
FIG. 9 is a sectional side view of the transparent panel and the non-transparent panel in the welding machine.
Figure 10:
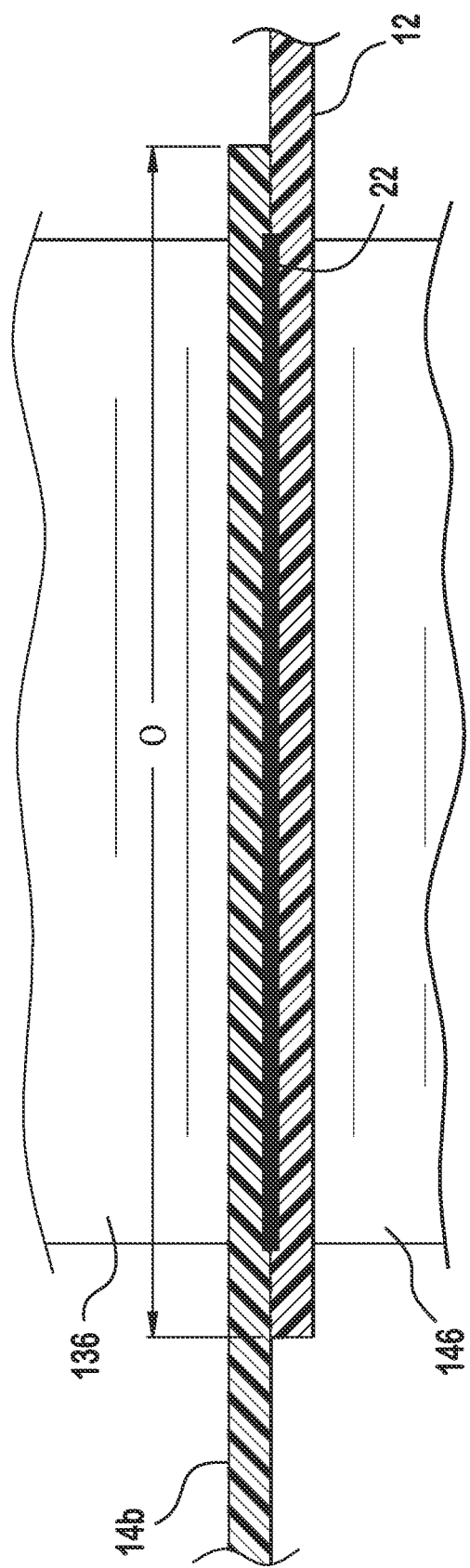
FIG. 10 is a detail sectional front view of the transparent panel and the non-transparent panel, taken along line 10-10 of FIG. 9.

After partial melting, as shown in FIGS. 7 and 9, the second non-transparent panel 14b exits the upper inner panel receiving passageway 158a and the transparent panel 12 exits the lower inner panel receiving passageway 154a. The panels 12, 14b exit the inner plates 154, 158 at a distance P from one another and move along the insertion direction I until they are pressed together along the overlapping length O by the roller wheels 136, 146 while still in a partially melted state. The panels 12, 14b subsequently cool as they move through the welding machine 100. The pressing together and subsequent cooling of the partially melted sides of the panels 12, 14b, as shown in FIG. 10, forms a plastic weld 22 between the panels 12, 14b along the overlapping length O. The lower side of the transparent panel 12 is thus joined 20 to the upper side of the second non-transparent panel 14b by the inner plastic weld 22. As described above, the upper side of the transparent panel 12 is identically joined 20 to the lower side of the first non-transparent panel 14b by the inner plastic weld 22.

The looping and joining of the upper side of the first non-transparent panel 14a to the surface of the first non-transparent panel 14a and the lower side of the second non-transparent panel 14b to the surface of the second non-transparent panel 14b will now be described with reference to FIGS. 1 and 11-14. Only the joining of the upper side of the first non-transparent panel 14a to the surface of the first non-transparent panel 14a will be described in detail with reference to the Figures, however, the joining of the lower side of the second non-transparent panel 14b to the surface of the second non-transparent panel 14b is symmetrically identical about the central axis C of the welding machine 100 shown in FIG. 4.

As shown in FIGS. 11 and 12, as the first non-transparent panel 14a moves through the welding machine 100 in the insertion direction I, the upper side of the first non-transparent panel 14a wraps around the support tube 190 of the outer plate assembly 180 and is disposed between the support tube 190 and the plate connection 195. The surface of the first non-transparent panel 14a passes through the lower outer panel receiving passageway 194a, and as the first non-transparent panel 14a moves in the insertion direction I, the upper side of the first non-transparent panel 14a progressively curves around the support tube 190 until it is fully disposed in the upper outer panel receiving passageway 188a as shown in FIG. 11. The guiding wheel 184 aids in the wrapping of the first non-transparent panel 14a around the support tube 190 and guides the upper side of the first non-transparent panel 14a into the upper outer panel receiving passageway 188a. At the outer plate assembly 180, as shown in FIGS. 11 and 12, the upper side of the first non-transparent panel 14a is spaced apart from the surface of the first non-transparent panel 14a by the distance P in the vertical direction V and overlaps the first non-transparent panel 14a by the length O in the longitudinal direction L.

As shown in FIG. 12, during joining and as the first non-transparent panel 14a moves through the welding machine 100 in the insertion direction I, the controller 210 controls the heater 196 of the outer heater assembly 170 to activate the heating element 199, emitting and transmitting a heat H in the direction of the outer plate assembly 180 from above the panel 14a. The heat H heats the first upper outer plate 186, the second upper outer plate 188, the first lower outer plate 192, and the second lower outer plate 194. When the plates 186, 188, 192, and 194 are heated to a certain temperature, as the upper side of the first non-transparent panel 14a passes through the upper outer panel receiving passageway 188a, the upper side of the first non-transparent panel 14a partially melts, and as the surface of the first non-transparent panel 14a passes through the lower outer panel receiving passageway 194a, the surface of the first non-transparent panel 14a partially melts. The temperature of the plates 186, 188, 192, and 194 and heat H required for partial melting, as would be understood by one with ordinary skill in the art, depends on the material used for the first non-transparent panel 14a.

Figure 13:
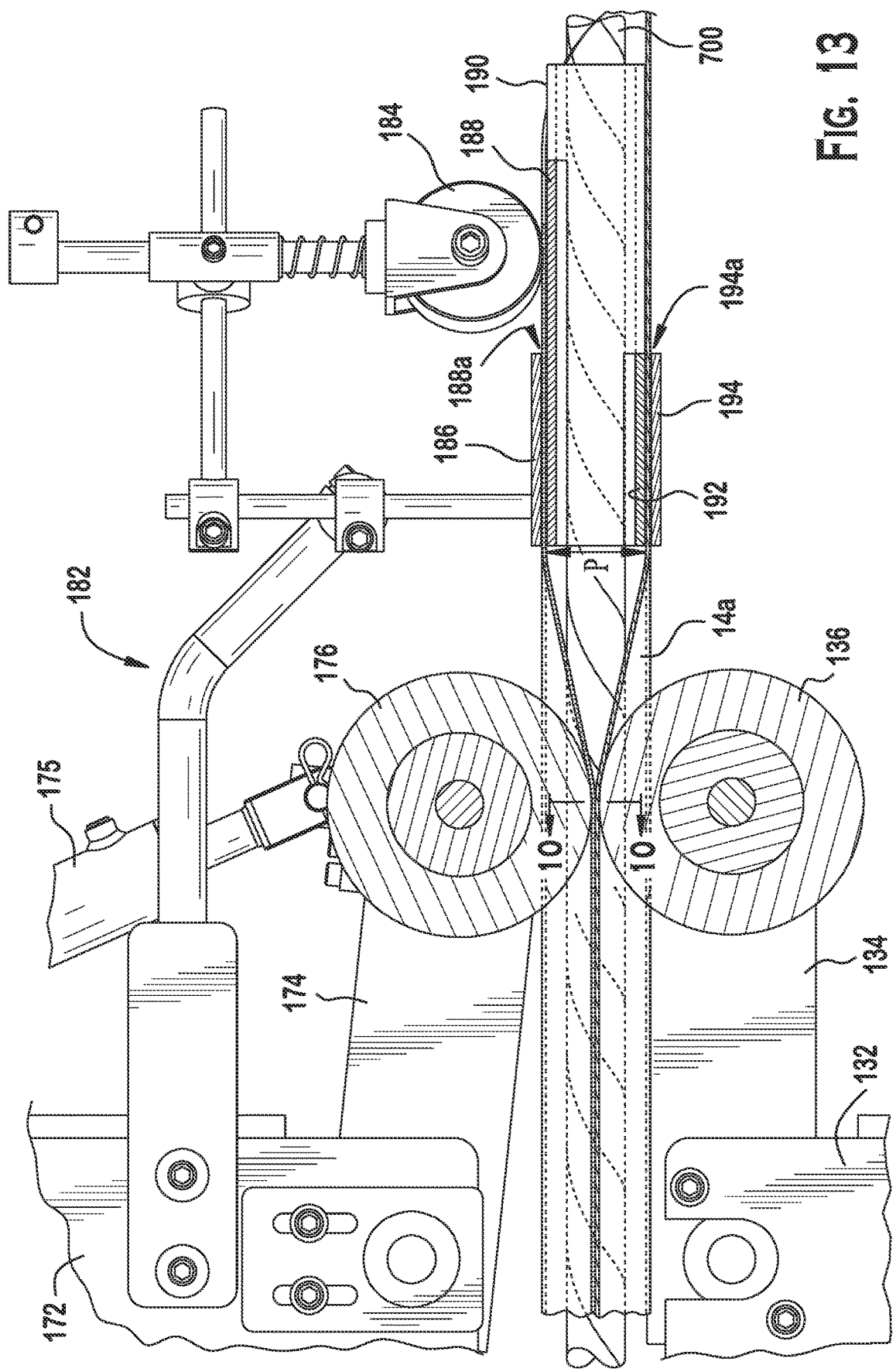
FIG. 13 is a sectional side view of the outer side of the non-transparent panel in the welding machine.

After partial melting, as shown in FIGS. 11 and 13, the upper side of the first non-transparent panel 14a exits the upper outer panel receiving passageway 188a and the surface of the first non-transparent panel 14a exits the lower outer panel receiving passageway 194a. The upper side of the first non-transparent panel 14a and the surface of the first non-transparent panel 14a exit the plates 186, 188, 192, and 194 at the distance P from one another and move along the insertion direction I until they are pressed together along the overlapping length O by the roller wheels 136, 176 while still in a partially melted state. The panel 14a subsequently cools as it moves through the welding machine 100.

Figure 14:
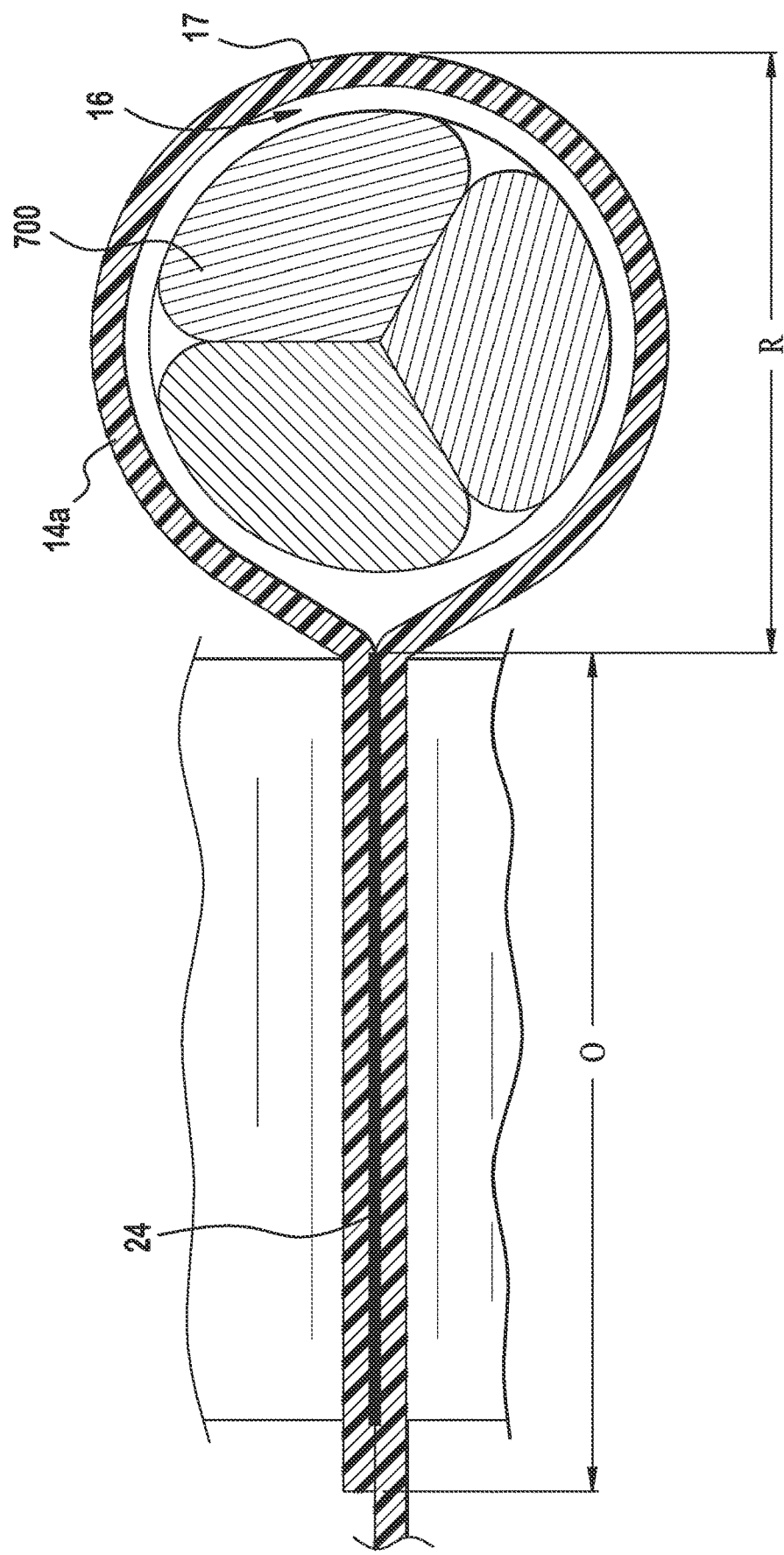
FIG. 14 is a detail sectional front view of the outer side of the non-transparent panel, taken along line 14-14 of FIG. 13.

The pressing together and subsequent cooling of the partially melted upper side of the first non-transparent panel 14a to the partially melted surface of the first non-transparent panel 14a, as shown in FIG. 14, forms an outer plastic weld 24 along the overlapping length O. As shown in FIG. 14, the upper side and the first non-transparent panel 14a are pressed together at a distance R from an upper folded edge 17 of the first non-transparent panel 14a formed by the joining process. Pressing at the distance R from the folded edge 17 forms a loop, supported by the support tube 190 during the aforementioned heating, which encloses the upper support receiving passageway 16. The upper side of the first non-transparent panel 14a is thus joined 20 to the surface of the first non-transparent panel 14a by the outer plastic weld 24, forming the upper support receiving passageway 16. As described above, the lower side of the second non-transparent panel 14b is identically joined 20 to the surface of the second non-transparent panel 14b by the outer plastic weld 24, forming the lower support receiving passageway 18.

As shown in FIGS. 1, 11, 13, and 14, in some embodiments, a rope 700 is positioned through the support tube 190 during the joining process of the upper side of the first non-transparent panel 14a to the surface of the first non-transparent panel 14a and the lower side of the second non-transparent panel 14b to the surface of the second non-transparent panel 14b. The rope 700 is then movably enclosed in the upper support receiving passageway 16 and the lower support receiving passageway 18 during the joining and is used as a support for the barn curtain 10.

The transparent panel 12 and the non-transparent panels 14a, 14b joined 20 by the inner plastic welds 22 and the outer plastic welds 24 as described above forms the finished curtain 10 shown in FIG. 2. The finished curtain 10 is moved along the insertion direction I by the drive shaft 206 and exits the welding machine 100 from the barn curtain receiving space 207 between the drive shaft 206 and the outlet roller 200. The barn curtain 10, as shown in FIG. 2, moves over the feeder shaft 640 of the barn curtain spooler 600 and is wound around the spool shaft 630 to form the barn curtain material spool 620. The barn curtain material spool 620 is a continuous length of finished curtain 10. The barn curtain 10 may be cut to a desired width in a direction W shown in FIG. 2 depending on the application.

The foregoing illustrates some of the possibilities for practicing the invention. Many other embodiments and fields of use of the invention are possible and within the scope and spirit of the invention. It is, therefore, intended that the foregoing description be regarded as illustrative rather than limiting.

What is claimed is:
1. A joiner for preparing a barn curtain comprising:
a welding machine;
a non-transparent panel feeder feeding non-transparent panel material to the welding machine;
a transparent panel feeder feeding transparent panel material to the welding machine, the non-transparent panel feeder and the transparent panel feeder are arranged separately;
a support roller supporting the feeding of the non-transparent panel feeder and the transparent panel feeder;

a heater assembly;
an inner plate support arm having:
a lower inner plate; and
a separate upper inner plate positioned above the lower inner plate, the transparent panel material is positioned through the lower inner plate while the non-transparent panel material is positioned through the upper inner plate, the heater assembly heats the upper inner plate and the lower inner plate, wherein a heat conductive material within the lower inner plate and the upper inner plate is thermally heated, melting the transparent panel material and the non-transparent material before the transparent panel material and the non-transparent material abut;
a support tube extending in a same direction as the transparent panel material and the non-transparent panel material; and
a barn curtain spooler receiving a barn curtain output from the welding machine.

2. The joiner for preparing the barn curtain of claim 1, wherein the welding machine includes a joining base.

3. The joiner for preparing the barn curtain of claim 2, wherein the welding machine further includes a pair of rails.

4. The joiner for preparing the barn curtain of claim 3, wherein the welding machine further includes a plurality of roller assemblies.

5. The joiner for preparing the barn curtain of claim 4, wherein the welding machine further includes a pair of inner heater assemblies.

6. The joiner for preparing the barn curtain of claim 5, wherein the welding machine further includes a pair of outer heater assemblies.

7. The joiner for preparing the barn curtain of claim 6, wherein the welding machine further includes an outlet roller.

8. The joiner for preparing the barn curtain of claim 7, wherein the welding machine further includes a drive shaft and a controller.

9. The joiner for preparing the barn curtain of claim 8, wherein the joining base has a pair of support legs spaced apart in a longitudinal direction of the welding machine.

10. The joiner for preparing the barn curtain of claim 9, wherein the pair of rails includes an upper rail and a lower rail.

11. The joiner for preparing the barn curtain of claim 10, wherein each roller assembly of the plurality of roller assemblies has a slidable attachment.

12. The joiner for preparing the barn curtain of claim 11, wherein the slidable attachment is attachable to either rail of the pair of rails.

13. The joiner for preparing the barn curtain of claim 1, wherein an upper side of the non-transparent material progressively curves around the support tube until it is fully disposed.

14. A joiner for preparing a barn curtain comprising:
a welding machine having:
a first inner heater assembly;
a second inner heater assembly;
a first outer heater assembly;
a second outer heater assembly;
a first inner roller assembly;
a second inner roller assembly;
a first outer roller assembly; and
a second outer roller assembly wherein, each of the first inner heater assembly, second inner heater assembly, first inner roller assembly, second inner roller assembly, first outer heater assembly, second outer heater assembly, first outer roller assembly, and second outer roller assembly being slidably attached to and movable along a rail of the welding machine in a longitudinal direction of the welding machine, the welding machine further includes a support tube extending perpendicular to the rail, an upper side of a non-transparent material extending in the same direction as the tube and progressively curves around the support tube until it is fully disposed;
an inner plate support arm having:
a lower inner plate; and
a separate upper inner plate positioned above the lower inner plate, a transparent panel material is positioned through the lower inner plate while the non-transparent panel material is positioned through the upper inner plate, the first inner heater assembly and a second inner heater assembly heats the upper inner plate and the lower inner plate, wherein a heat conductive material within the lower inner plate and the upper inner plate is thermally heated, melting the transparent panel material and the non-transparent material before the transparent panel material and the non-transparent material abut.

15. The joiner for preparing the barn curtain of claim 14, wherein the joiner further comprises a non-transparent panel feeder feeding non-transparent panel material to the welding machine.

16. The joiner for preparing the barn curtain of claim 15, wherein the joiner further comprises a transparent panel feeder feeding transparent panel material to the welding machine.

17. The joiner for preparing the barn curtain of claim 16, wherein the roller assemblies are positioned opposite the corresponding heater assembly.

18. The joiner for preparing the barn curtain of claim 14, wherein each outer heater assembly includes an outer plate assembly, the outer plate assembly includes an outer plate support arm having a first end fixed to an outer heater base and an opposite second end extending away from the outer heater base, the outer plate support arm is attached to and supports a guiding wheel.

19. A joiner, comprising:
a welding machine having:
a first inner heater assembly including a first inner roller wheel, a first inner plate assembly having a first lower inner plate and a first upper inner plate spaced apart from the first lower inner plate in a vertical direction, and a first inner heater;
a second inner heater assembly including a second inner roller wheel, a second inner plate assembly having a second lower inner plate and a second upper inner plate spaced apart from the second lower inner plate in a vertical direction, and a second inner heater;
a first outer heater assembly including a first outer roller wheel, a first outer plate assembly having a first upper outer plate and a second upper outer plate forming a first upper outer panel receiving passageway therebetween, a first lower outer plate and a second lower outer plate forming a first lower outer panel receiving passageway therebetween;
a first support tube connected to each of the second upper outer plate and the first lower outer plate, and a first plate connection curved around the support tube and connecting the first upper outer plate and the second lower outer plate, and a first outer heater;

a second outer heater assembly including a second outer roller wheel, a second outer plate assembly having a third upper outer plate and a fourth upper outer plate forming a second upper outer panel receiving passageway therebetween, a third lower outer plate and a fourth lower outer plate forming a second lower outer panel receiving passageway therebetween, a second support tube connected to each of the fourth upper outer plate and the third lower outer plate, and a second plate connection curved around the second support tube and connecting the third upper outer plate and the fourth lower outer plate, and a second outer heater;

a first inner roller assembly including a third inner roller wheel aligned with the first inner roller wheel;

a second inner roller assembly including a fourth inner roller wheel aligned with the second inner roller wheel;

a first outer roller assembly including a third outer roller wheel aligned with the first outer roller wheel;

a second outer roller assembly including a fourth outer roller wheel aligned with the second outer roller wheel, each of the first inner heater, the second inner heater, the first outer heater, and the second outer heater aligned in a longitudinal plane of the welding machine, each of the first inner heater assembly, second inner heater assembly, first inner roller assembly, second inner roller assembly, first outer heater assembly, second outer heater assembly, first outer roller assembly, and second outer roller assembly being slidably attached to and movable along a rail of the welding machine in the longitudinal direction of the welding machine;

a first side of a transparent panel is positioned through a first lower inner panel receiving passageway of the first lower inner plate; a side of a first non-transparent panel through a first upper inner panel receiving passageway of the first upper inner plate;

an opposite second side of the transparent panel is positioned through a second lower inner panel receiving passageway of the second lower inner plate; a side of a second non-transparent panel through a second upper inner panel receiving passageway of the second upper inner plate;

an opposite second side of the first non-transparent panel positioned through the first upper outer panel receiving passageway and wrapping the first non-transparent panel around the first support tube of the first outer heater assembly and positioning a portion of the first non-transparent panel within the first lower outer panel receiving passageway; and an opposite second side of the second non-transparent panel positioned through the second upper outer panel receiving passageway and wrapping the second non-transparent panel around the second support tube of the second outer heater assembly and positioning a portion of the second non-transparent panel within the second lower outer panel receiving passageway, the first lower inner plate and the first upper inner plate are directly heated with the first inner heater; the second lower inner plate and the second upper inner plate with the second inner heater; the first upper outer plate, the second upper outer plate, the first lower outer plate and the second lower outer plate with the first outer heater; and the third upper outer plate, the fourth upper outer plate, the third lower outer plate and the fourth lower outer plate with the second outer heater;

the first side of the transparent panel abuts against the side of the first non-transparent panel between the first inner roller wheel and the third inner roller wheel to join the side of the first non-transparent panel and the first side of the transparent panel by a first inner plastic weld;

the opposite second side of the transparent panel abuts against the side of a second non-transparent panel between the second inner roller wheel and the fourth inner roller wheel to join the side of the second non-transparent panel and the opposite second side of the transparent panel by a second inner plastic weld;

the opposite second side of the first non-transparent panel abuts against the portion of the second non-transparent panel between the first outer roller wheel and the third outer roller wheel to join the portion of the second non-transparent panel and the opposite second side of the first non-transparent panel by a first outer plastic weld; and the opposite second side of the second non-transparent panel abuts against the portion of the second non-transparent panel between the second outer roller wheel and the fourth outer roller wheel by a second outer plastic weld.

* * * * *